United States Patent [19]

Bermes

[11] Patent Number: 5,173,086
[45] Date of Patent: Dec. 22, 1992

[54] CONCENTRATED AQUEOUS SOLUTIONS OF 2-PHENYLBENZOTHIAZOLEAZO DYES WITH MIXED CATIONS

[75] Inventor: Rudolf Bermes, Ludwigshafen, Fed. Rep. of Germany

[73] Assignee: BASF Aktiengesellschaft, Ludwigshafen, Fed. Rep. of Germany

[21] Appl. No.: 758,691

[22] Filed: Sep. 12, 1991

[30] Foreign Application Priority Data

Sep. 29, 1990 [DE] Fed. Rep. of Germany ....... 4030915

[51] Int. Cl.$^5$ ..................... C09B 67/26; D21H 21/28
[52] U.S. Cl. ........................................... 8/527; 8/620; 8/684; 8/688; 8/689; 8/919; 8/585
[58] Field of Search ................. 8/527, 688, 689, 919, 8/527, 688, 690, 689, 684, 620

[56] References Cited

U.S. PATENT DOCUMENTS

| | | | |
|---|---|---|---|
| 3,963,418 | 6/1976 | Tullio | 8/527 |
| 4,071,312 | 1/1978 | Blackwell | 8/684 |
| 4,804,387 | 2/1989 | Degen et al. | 8/641 |
| 4,877,412 | 10/1989 | Pedrazzi | 8/437 |
| 4,995,885 | 2/1991 | Morawietz | 8/527 |
| 5,096,458 | 3/1992 | Michna et al. | 8/527 |

FOREIGN PATENT DOCUMENTS 1593859  7/1981  United Kingdom .

Primary Examiner—A. Lionel Clingham
Attorney, Agent, or Firm—Oblon, Spivak, McClelland, Maier & Neustadt

[57] ABSTRACT

Aqueous solutions containing, each percentage being based on the weight of the aqueous solution,
a) from 5 to 20% by weight of the dye of the formula

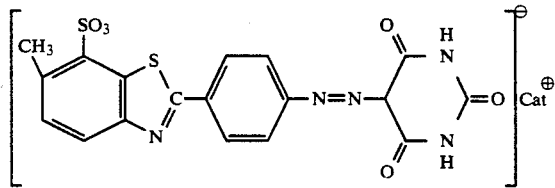

(calculated as free acid) where cat$^\oplus$ is a mixture of cations comprising from 5 to 50 mol % of lithium ions, from 5 to 40 mol % of diethanolammonium ions and from 20 to 90 mol % of triethanolammonium ions, and
b) from 0 to 15% of urea, are useful for dyeing paper stock.

4 Claims, No Drawings

CONCENTRATED AQUEOUS SOLUTIONS OF 2-PHENYLBENZOTHIAZOLEAZO DYES WITH MIXED CATIONS

The present invention relates to novel aqueous solutions containing, each percentage being based on the weight of the aqueous solution,
a) from 5 to 20 % by weight of the dye of the formula I

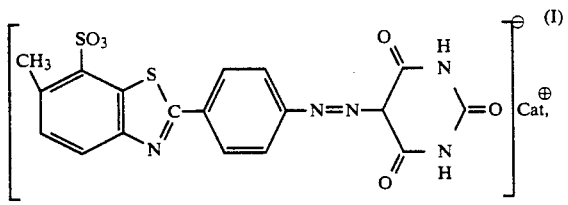

(calculated as free acid) where cat⊕ is a mixture of cations comprising from 5 to 50 mol % of lithium ions, from 5 to 40 mol % of diethanolammonium ions and from 20 to 90 mol % of triethanolammonium ions, and
b) from 0 to 15 % of urea, and to the use thereof for dyeing paper stock.

U.S. Pat. No. 4,071,312 discloses dyes with the above-mentioned dye anion. The counter-ions thereto are lithium, sodium or triethanolammonium ions.

DE-A-2 754 486 discloses the preparation of dye solutions with the abovementioned dye anion and not only diethanolammonium but also triethanolammonium ions as counter-ions.

However, it has been found that the prior art dye solutions are not sufficiently stable.

It is an object of the present invention to provide novel concentrated aqueous solutions of the dye with the abovementioned anion which shall have a long shelf life.

We have found that this object is achieved by the aqueous solutions defined at the beginning.

In these solutions, the dye anion can take various tautomeric forms, for example

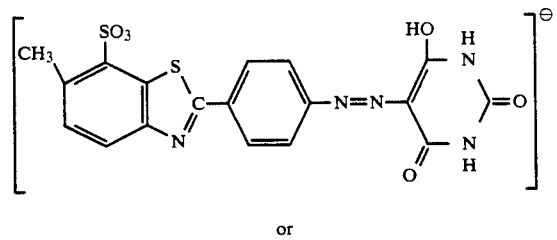

or

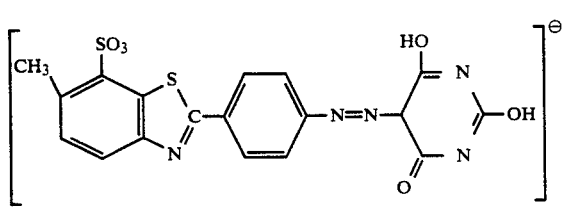

which are all embraced by the claim.

The aqueous solutions of the present invention are advantageously prepared by producing the salts of the dye in situ, i.e. by first diazotizing the amine dehydrothio-p-toluidinesulfonic acid of the formula II

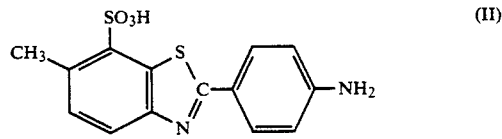

and then coupling the diazonium salt in a conventional manner to barbituric acid of the formula III

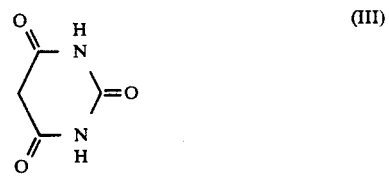

and adding lithium hydroxide, diethanolamine and triethanolamine in the required ratio. Afterwards urea may also be added. Finally, water may be added to adjust the concentration of the dye of the formula I to that claimed.

The aqueous solutions of the present invention may further contain from 0 to 10 % by weight, preferably 0 to 5 % by weight, each percentage being based on the weight of the aqueous solution, of a water-miscible organic solvent. Such solvents are for example glycols, polyglycols and glycol ethers, such as 1,2-ethanediol, 1,2- or 1,3-propanediol, 1,2-, 1,3-, 1,4- or 2,3-butanediol, 1,5-pentanediol, neopentylglycol, 1,6-hexanediol, 2-methoxyethanol, 1-methoxy-2-propanol or 2-methoxypropanol, as well as amides, such as N,N-dimethylformamide, N,N-diethylformamide, N-methylpyrrolidinone or ε-caprolactam.

The diazotization of the amine II is effected in a conventional manner, for example with sodium nitrite and hydrochloric acid or with neopentylglycol dinitrite. In the latter case, the aqueous solution of the present invention contains neopentylglycol, formed from the diazotizing reagent.

In general, from 100 to 130 mol % of a mixture of diethanolamine, triethanolamine and lithium hydroxide is used per 100 mol % of amine II.

Preference is given to aqueous solutions which contain from 10 to 20 % by weight of the dye of the formula I, calculated as free acid, and from 0 to 10 % by weight of urea.

Particular preference is given to aqueous solutions which contain the dye of the formula I where cat⊕ is a mixture of cations comprising from 5 to 50 mol % of lithium ions, from 5 to 30 mol % of diethanolammonium ions and from 30 to 90 mol % of triethanolammonium ions.

It has been found that the proportion of urea can be small or even zero provided the level of lithium ions in the aqueous solutions of the present invention is high.

The aqueous solutions of the present invention have a very long shelf life. In contradistinction to the preparation disclosed in DE-A-2 754 486, the novel aqueous solutions contain only about one fifth of the amount of base used in the cited reference.

Stored for two weeks at 60° C., which amounts to an accelerated aging test, the aqueous solutions of the present invention are virtually free of any noticeable crystallization. When stored at room temperature, the shelf life is up to 12 months.

The novel aqueous solutions are advantageous for dyeing or printing paper stock in a conventional manner. They are preferably employed in processes for dyeing and printing paper, paperboard or cardboard in suspension and for surface dyeing. Any kind of paper can be dyed, in particular bleached, sized or unsized lignin-free paper, for which the starting material may be bleached or unbleached pulp.

The following Examples further illustrate the invention:

EXAMPLE 1

320 g (1 mol) of dehydrothio-p-toluidinesulfonic acid were suspended in 1,500 ml of water and 71.6 g (1.28 mol) of potassium hydroxide at room temperature and mixed with 345 g of a 3.33 molar aqueous sodium nitrite solution. This batch was added to a stirred mixture of 250 g of concentrated hydrochloric acid and 500 g of ice. The temperature rose steeply and was limited to 30° C by external cooling. After stirring for one hour, the remaining excess nitrite was destroyed with 1 g of sulfamic acid, and the yellow diazonium salt was filtered off with suction and washed with 4000 ml of water until substantially acid-free. This gave 872 g of a moist, sparingly soluble diazonium salt.

174.4 g (0.2 mol) of this moist diazonium salt were stirred with 300 ml of water and 25.6 g (0.2 mol) of barbituric acid at room temperature for half an hour. 2.4 g (0.1 mol) of lithium hydroxide were then sprinkled into the mixture, followed in succession by 18.7 g (0.1 mol) of 80 % strength by weight aqueous triethanolamine solution and 6.6 g (0.05 mol) of 80 % strength by weight aqueous diethanolamine solution, both added dropwise over 30 minutes. The reaction mixture was slightly cooled during the onset of the coupling reaction in order to keep the temperature below 35° C. When the reaction had ended, the solution was clear and was finally adjusted with water to give a total amount of 600 g of stable solution.

EXAMPLE 2

174.4 g (0.2 mol) of the diazonium salt of dehydrothio-p-toluidinesulfonic acid prepared in Example 1 were stirred with 300 ml of water and 25.6 g (0.2 mol) of barbituric acid at room temperature for half an hour. With moderate cooling, 1.8 g (0.074 mol) of lithium hydroxide, 28.0 g (0.15 mol) of 80 % strength by weight aqueous triethanolamine solution and 3.3 g (0.025 mol) of 80 % strength by weight aqueous diethanolamine solution were added in succession over about 30 minutes, and after the coupling had ended the solution was brought to a total amount of 600 g with 30 g of water and urea. The originally slightly cloudy solution turned into a clear, stable dye solution on moderate heating to 50° C.

EXAMPLE 3

Example 1 was repeated, except that 0.6 g (0.024 mol) of lithium hydroxide, 32.6 g (0.175 mol) of 80 % strength by weight aqueous triethanolamine solution and 6.6 g (0.05 mol) of 80 % strength by weight aqueous diethanolamine solution were used to start the coupling reaction. At the end 60 g of urea and water were added to produce a total amount of 600 g of a stable solution of the dye.

EXAMPLE 4

64.1 g (0.2 mol) of dehydrothio-p-toluidine-sulfonic acid and 300 ml of water were stirred at room temperature and admixed with 17.5 g of neopentyl glycol dinitrite added dropwise in the course of an hour. After stirring for three hours, the remaining excess nitrite was destroyed with 0.5 g of sulfamic acid. The suspension of the yellow diazonium salt was then admixed with 25.6 g (0.2 mol) of barbituric acid followed in the course of half an hour by 1.2 g (0.05 mol) of lithium hydroxide, 32.6 g (0.175 mol) of 80 % strength by weight aqueous triethanolamine solution and 3.3 g (0.025 mol) of 80 % strength by weight aqueous diethanolamine solution. In the course of the distinctly exothermic coupling reaction the solution of the dye turned clear and was finally adjusted with 30 g of urea and water to give a total amount of 600 g of stable solution.

The same method can be used to obtain stable solutions on using the following amounts of lithium hydroxide, di- and triethanolamine and urea. The amounts of di- and triethanolamine used here always relate to an 80% strength by weight aqueous solution.

| Example no. | Lithium hydroxide [g] | Tri-ethanolamine [g] | Di-ethanolamine [g] | Urea [g] |
|---|---|---|---|---|
| 5 | 1.8 | 23.5 | 6.6 | 0 |
| 6 | 0.6 | 32.6 | 6.6 | 60 |
| 7 | 2.4 | 23.5 | 3.3 | 0 |
| 8 | 1.2 | 28.0 | 6.6 | 30 |
| 9 | 0.6 | 37.5 | 3.3 | 60 |
| 10 | 0.6 | 28.0 | 9.9 | 30 |

We claim:

1. An aqueous solution, containing, each percentage being based on the weight of the aqueous solution,
   a) from 5 to 20 % by weight of the dye of the formula I

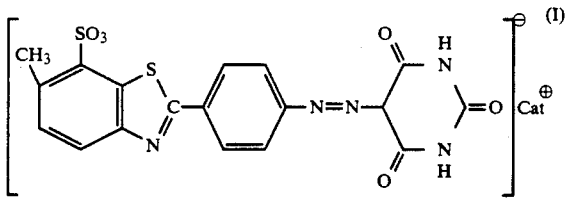

(calculated as free acid) where cat$^\oplus$ is a mixture of cations comprising from 5 to 50 mol % of lithium ions, from 5 to 40 mol % of diethanolammonium ions and from 20 to 90 mol % of triethanolammonium ions, and
   b) from 0 to 15 % of urea.

2. An aqueous solution as claimed in claim 1, containing from 10 to 20 % by weight of the dye of the formula I, calculated as free acid, and from 0 to 10 % by weight of urea.

3. An aqueous solution as claimed in claim 1, containing the dye of the formula I in which cat$^\oplus$ is a mixture of cations comprising from 5 to 50 mol % of lithium ions, from 5 to 30 mol % of diethanolammonium ions and from 30 to 90 mol % of triethanolammonium ions.

4. A method of dyeing paper stock comprising using an aqueous solution as claimed in claim 1.

* * * * *